United States Patent
Tanaka et al.

[11] Patent Number: 5,903,568
[45] Date of Patent: May 11, 1999

[54] OSI MULTILAYER MANAGEMENT SYSTEM

[75] Inventors: Katsuyuki Tanaka; Teruyuki Kawagoe, both of Tokyo, Japan

[73] Assignee: NEC Corporation, Tokyo, Japan

[21] Appl. No.: 08/808,963

[22] Filed: Feb. 19, 1997

[30] Foreign Application Priority Data

Feb. 19, 1996 [JP] Japan .................................. 8-031005

[51] Int. Cl.$^6$ .................................................. G06F 13/00
[52] U.S. Cl. ............................................................ 370/469
[58] Field of Search .................................. 370/469, 465, 370/466, 467, 476; 395/200.53, 200.59, 200.6, 200.73, 200.74, 200.76, 200.31, 200.32

[56] References Cited

U.S. PATENT DOCUMENTS 5,414,812  5/1995  Filip et al. ......................... 395/200.53
5,786,770  7/1998  Thompson ............................... 370/469

OTHER PUBLICATIONS

International Telecommunication Union, Recommendation M.3010 (Oct. 1992), pp. 1–64.

*Primary Examiner*—Huy D. Vu
*Attorney, Agent, or Firm*—Sughrue, Mion, Zinn, Macpeak & Seas, PLLC

[57] ABSTRACT

A hierarchical manager-agent structure has upper and lower layers in an open system having OSI standard protocol specifications. The upper layer has an upper-layer manager, an upper-layer agent, and managed objects, and the lower layer has a lower-layer manager, a lower-layer agent. If an operation requested from an upper-layer manager and effected on a managed object in an upper layer by an upper-layer agent affects a managed object in a lower layer, or if an operation reported from a lower layer agent to a lower-layer manager affects a managed object in an upper layer, then corresponding managed-object instances between the upper and lower layers and their operations are converted by a managed-object correspondence information converter based on information stored in a managed-object correspondence information database. The managed-object correspondence information converter has a common interface with respect to both the upperlayer agent and the lower-layer manager.

7 Claims, 8 Drawing Sheets

LAYER n

| MANAGED-OBJECT ID | OPERATION | RELATED LAYER | RELATED MANAGED-OBJECT LIST | RELATED MANAGED-OBJECT OPERATION | PARAMETER CONVERSION RULE |
|---|---|---|---|---|---|
| $M_n1$ | $O_n1$ | n-1 | $M_{n-1}1 - M_{n-1}2$ | $O_{n-1}1$ | R1 |
| | $O_n2$ | n-1 | $M_{n-1}1 - M_{n-1}3$<br>$M_{n-1}1 - M_{n-1}4$ | $O_{n-1}2$<br>$O_{n-1}3$ | R2<br>R3 |
| | $O_n3$ | n-1 | $M_{n-1}1 - M_{n-1}2 - M_{n-1}5$<br>$M_{n-1}1 - M_{n-1}6 - M_{n-1}7$ | $O_{n-1}4$<br>$O_{n-1}5$ | R4<br>R5 |
| | ⋮ | ⋮ | ⋮ | ⋮ | ⋮ |
| $M_n2$ | ⋮ | ⋮ | ⋮ | ⋮ | ⋮ |
| ⋮ | ⋮ | ⋮ | ⋮ | ⋮ | ⋮ |

LAYER n-1

| MANAGED-OBJECT ID | OPERATION | RELATED LAYER | RELATED MANAGED-OBJECT LIST | RELATED MANAGED-OBJECT OPERATION | PARAMETER CONVERSION RULE |
|---|---|---|---|---|---|
| $M_{n-1}1 - M_{n-1}2$ | $R_{n-1}1$ | n | $M_{n-1}1$ | $R_n1$ | R6 |
| $M_{n-1}1 - M_{n-1}3$<br>$M_{n-1}1 - M_{n-1}4$ | $R_{n-1}2$<br>$R_{n-1}3$ | n<br>n | $M_{n-1}1 (1/2)$<br>$M_{n-1}1 (2/2)$ | $R_n2$ | R7 |
| ⋮ | ⋮ | ⋮ | ⋮ | ⋮ | ⋮ |
| $M_{n-1}1$ | $N_{n-1}1$ | n | $M_n1 - M_n3$ | $N_n10$ | R8 |
| $M_{n-1}2$ | $N_{n-1}2$<br>$N_{n-1}3$ | n<br>n | $M_n1 - M_n4$<br>$M_n1$ | $N_n11$<br>$N_n12$ | R9<br>R10 |
| ⋮ | ⋮ | ⋮ | ⋮ | ⋮ | ⋮ |

OSI MULTILAYER MANAGEMENT SYSTEM

BACKGROUND OF THE INVENTION

1. Field of the Invention

The present invention relates to an OSI multilayer management system.

2. Description of the Related Art

Based on the ITU-T Recommendation M.3010, conventional OSI multilayer management systems have been divided into and modeled after a business management layer, a service management layer, a network management layer, a device management layer, and a device layer. Generally, each of the layers comprises a manager and an agent. The manager requests the agent to provide a service, and the agent provides the service to the manager. Fault information detected by the agent and changes of attributes are reported as an event notification from the agent to the manager.

Figure 2:
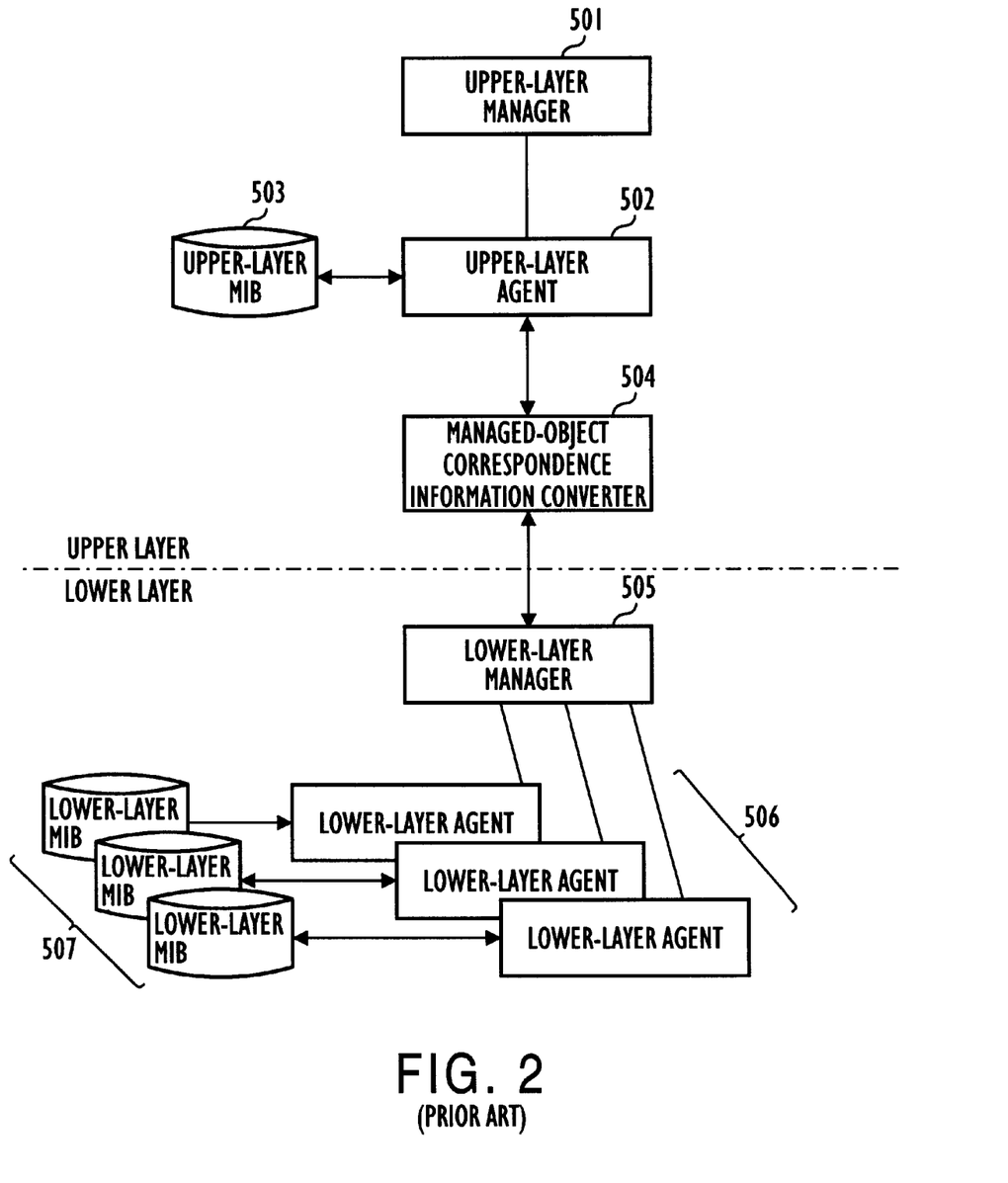
FIG. 2 is a block diagram of a conventional OSI multilayer management system.

FIG. 2 of the accompanying drawings shows a conventional OSI multilayer management system. As shown in FIG. 2, an upper-layer agent 502 requested to provide a service by an upper-layer manager 501 accesses an upper-layer MIB (Management Information Base) 503 to perform a management service function. If necessary, the upper-layer agent 502 may issue a new service request to a manager in a layer immediately therebelow, i.e., a lower-layer manager 505. The management system of each layer has unique management information model information. In order to do a service between layers, a managed-object correspondence information converter 504 is defined for relating managed objects to each other between the layers. The managed-object correspondence information converter 504 corresponds to an ICF (Information Converting Function) prescribed in the figure V-2/M.3010 on page 61 of the ITU-T Recommendation M.3010.

When a managed object stored in the upper-layer MIB 503 needs to access a managed object stored in lower-layer MIBs 507 managed by the lower-layer manager 505, the managed-object correspondence information converter 504 identifies one of the lower-layer MIBs 507 whose upper-most instance in an inclusion relation corresponds to the managed object, and transmits information representative of such correspondence and a management operation requested by the upper-layer manager 501 to the lower-layer manager 505.

Based on the upper-most instance in an inclusion relation of the lower-layer MIB 507 which has been identified by the managed-object correspondence information converter 504, i.e., the information indicative of which one of the lower-layer MIBs 507 the request has been directed to, and the information indicative of what type of operation is to be effected on the identified lower-layer MIB 507, the lower-layer manager 505 analyzes the information to determine what operation is requested by the request with respect to which managed-object instance of the lower-layer MIBs 507 managed by which one of lower-layer agents 506. Based on the determined results, the lower-layer manager 505 transmits a request with respect to the managed-object instance and the management operation stored in the lower-layer MIB 507 to the lower-layer agent 506.

In response to the request transmitted from the lower-layer manager 505, the lower-layer agent 506 carries out the management operation on the managed-object instance stored in the lower-layer MIB 507.

When the management operation is finished in the lower-layer MIB 507, the lower-layer agent 506 transmits an operation response result to the lower-layer manager 505, which then determines which one of the lower-layer MIBs 507 the operation response result has come from, i.e., one of the lower-layer MIBs 507 whose upper-most instance in an inclusion relation corresponds to the operation response result. The lower-layer manager 505 transfers the managed-object information of the managed object of the determined lower-layer MIB 507 and a response result which has been converted to a type of data that can be interpreted by the upper-layer agent 502 and the upper-layer manager 501 corresponding to the determined managed object, to the managed-object correspondence information converter 504.

Based on the received response information, the managed-object correspondence information converter 504 locates a corresponding managed object in the upper layer, and transfers the response information through the upper-layer agent 502 to the managed object stored in the upper-layer MIB 503 which has issued the operation request. The managed object stored in the upper-layer MIB 503 effects internal processing using the response information, transmits a processed result through the upper-layer agent 502 to the upper-layer manager 501, and finishes the processing.

An event notification from the lower layer to the upper layer is processed in a manner similar to the above processing of the request. Specifically, when an event notification is issued from the lower-layer agents 506 to the lower-layer manager 505, the lower-layer manager 505 determines, from the managed-object instance of the lower-layer MIB 507 which has notified an event, which one of the lower-layer MIBs 507 corresponds to the event notification, i.e., the upper-most instance in an inclusion relation with respect to the managed-object instance which has issued the event notification, converts the contents of the notification of the managed-object instance of the lower-layer MIB 507 which has notified the event to a type of data which can be interpreted by the upper-layer agent 502 or the upper-layer manager 501, and notifies the managed-object correspondence information converter 504 of the event. The managed-object correspondence information converter 504 determines which one of the managed objects in the upper layer corresponds to the managed-object instance which has issued the event notification, and indicates the result to the upper-layer agent 502 thereby to update the data in the upper-layer MIB 503 and report the event notification to the upper-layer manager 501.

In the conventional OSI multilayer management system shown in FIG. 2, the managed-object correspondence information converter 504 positioned in the upper layer has to recognize at all times the relationship between the lower-layer manager 505 and the managed-object instances of the upper-layer agent 502, and the lower-layer manager 505 positioned in the lower layer has to recognize at all times what operation has to be actually effected on which managed-object instance stored in which lower-layer MIB 507 by the upper-most managed-object instance in an inclusion relation of the lower-layer MIB 507 designated from the managed-object correspondence information converter 504 and its operation request, and has to convert the operation request.

Figure 1:
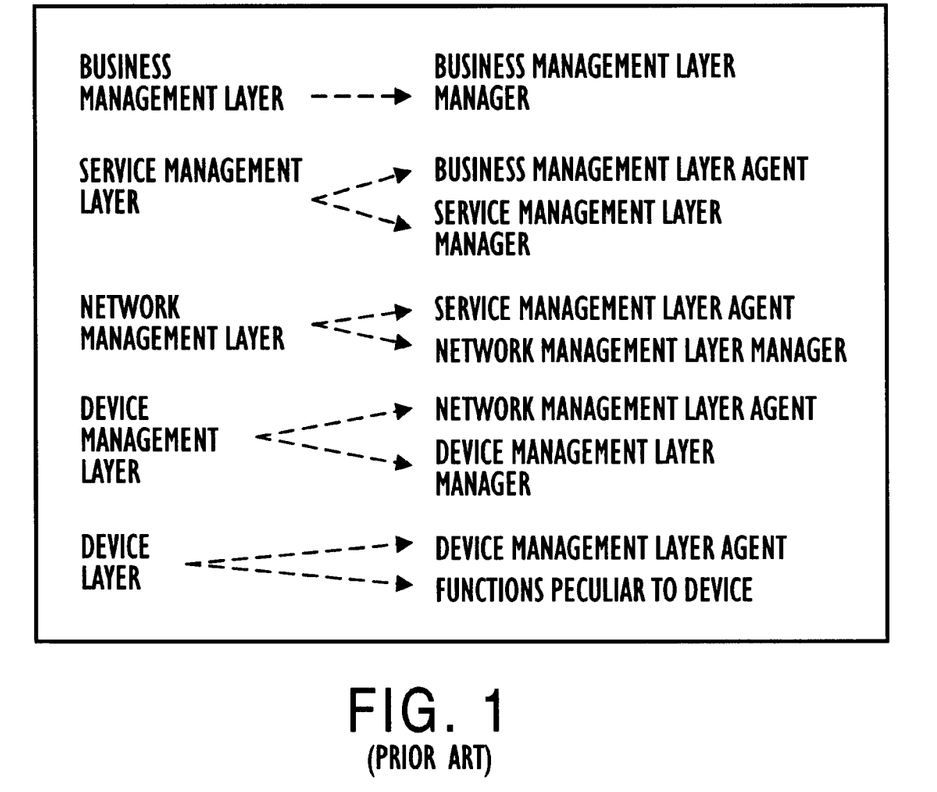
FIG. 1 is a diagram illustrative of an OSI multilayer management system.

According to the ITU-T Recommendation M.3010, a range to be managed is divided into a hierarchical system of layers for the purpose of making the managers and agents functionally independent of each other, as shown in FIG. 1 of the accompanying drawings. For actual installations, however, an application program has to be developed in which upper and lower layers recognize each other at all times, and changes in the definition of managed objects in the upper or lower layer and the specifications of operations greatly affect the upper and lower layers. In the conventional system, the managed-object correspondence information converter 504 converts a managed object with respect to which an operation request has been issued from the upper-layer agent 502 to the upper-most instance in an inclusion relation of a lower-layer MIB 507, and the lower-layer manager 505 specifies a managed-object instance with respect to which the operation request is to be actually applied, and converts the operation request to a type of data which can be interpreted by the managed object that is to be actually operated. Since such a complex double conversion process is required, a large processing burden is imposed on the managed-object correspondence information converter 504 and the lower-layer manager 505, resulting in a performance problem.

The system has inherent interfaces used as an interface between the upper-layer agent 502 and the managed-object correspondence information converter 504 and an interface between the lower-layer manager 505 and the managed-object correspondence information converter 504. For the managed-object correspondence information converter 504, it has been necessary to fabricate a software program in which respective interfaces with the upper and lower layers are defined. Since these interfaces are not common in nature, there has been a problem in that the software program cannot be diverted in the same layer.

SUMMARY OF THE INVENTION

It is an object of the present invention to provide an OSI multilayer management system which will simplify the complex processing that has heretofore been carried out between a managed-object correspondence information converter and a lower-layer manager, for improved system performance.

Another object of the present invention is to provide an OSI multilayer management system which is capable of increasing independence between upper and lower layers for thereby minimizing changes in an application program due to changes in specifications or the like, and making interfaces common with respect to upper and lower layers for thereby diverting an application program in the same layer, with a resulting reduction in the number of steps required to develop a software program.

To achieve the above objects, there is provided in accordance with the present invention 1. An OSI multilayer management system comprising a hierarchical manager-agent structure of upper and lower layers in an open system having OSI standard protocol specifications, the upper layer having an upper-layer manager, an upper-layer agent, and managed objects, and the lower layer having a lower-layer manager, a lower-layer agent, and managed objects, a managed-object correspondence information database storing related information of the managed objects of the upper and lower layers, and managed-object correspondence information convert means connected to the managed-object correspondence information database, for receiving operations, responses, and event notifications from the managed objects of the upper and lower layers, converting operations, responses, and event notifications from the managed objects of one of the upper and lower layers to operations, responses, and event notifications for the managed objects of the other of the upper and lower layers, and requesting the upper-layer agent or the lower-layer manager to effect operations, responses, and event notifications, the upper-layer agent having a communication path connected to the managed-object correspondence information convert means and comprising means for issuing an operation request through the communication path to operate the managed objects in the lower layer, receiving a response to the operation request and an event notification from the managed objects in the lower layer, and effecting an operation on the managed objects in the upper layer based on the received event notification, the lower-layer manager having a communication path connected to the managed-object correspondence information convert means and comprising means for issuing an event notification through the communication path to the managed objects in the upper layer.

The managed object correspondence information convert means is connected to the managed-object correspondence information database which is accessible from both the upper layer and the lower layer. Therefore, when an operation request is issued from a managed object in the upper layer to a related managed object in the lower layer, a corresponding managed-object instance in the lower layer and an operation corresponding thereto can be located. Furthermore, when an event notification is reported from a managed object in the lower layer to a managed object in the upper layer, a corresponding managed-object instance in the upper layer and an operation corresponding thereto can be located.

The managed object correspondence information database stores two types of data depending on which one of the upper and lower layers has issued a management operation request, each of the two types of data including managed-object ID items indicative of identifiers of the managed objects, operation items with respect to the managed objects identified by the managed-object ID items, related layer items indicative of the layers in which managed objects related to the managed objects identified by the managed-object ID items are stored, related managed object list items storing a list indicative of correspondence between the managed objects identified by the managed-object ID items and instances which are actual managed objects of those managed objects in the layers indicated by the related layer items, related managed-object operation items indicative of operations with respect to managed objects indicated by the related managed-object list items, parameter conversion rule items indicative of parameter conversion rules for converting detailed parameters accompanying operations/responses between the related managed-object operation items and the operation items, and a table of association between the parameter conversion rules and actual conversion formulas with respect to the parameter conversion rule items.

An operation request from the upper-layer agent to the lower-layer manager and a response thereto can be issued, and an event notification about an event that has occurred in the lower-layer agent can be reported from the lower-layer manager to the upper-layer agent without the upper and lower layers being concerned with each other.

Consequently, an application program for the lower-layer manager can be developed independently of detailed specifications of the upper-layer agent, and changes in the correspondence between and addition of functions to the managed objects of the upper-layer agent and the managed objects of the lower-layer agent can be made without modifying the application program for the lower-layer manager.

The reasons for the foregoing are that the correspondence between the managed objects of the upper-layer agent and the managed objects of the lower-layer agent is handled altogether by the managed-object correspondence information convert means, information of the correspondence is stored altogether in the managed-object correspondence information database which is handled by the managed-object correspondence information convert means, and the relationship between directly corresponding instances between the upper and lower layers, operation requests/ responses, and conversion of detailed parameters with respect to notifications are processed altogether by the managed-object correspondence information convert means.

Heretofore, the managed objects and the contents of operations thereof have been modified by respective application software programs for the respective upper and lower layers. According to the present invention, such double software processing is not required because the managed-object correspondence information convert means can search the database for direct correspondence between the upper and lower layers and hence can perform high-speed processing.

The managed-object correspondence information convert means has a common interface with respect to the lower-layer manager and the upper-layer agent.

The managed-object correspondence information database stores not only the correspondence between the managed objects of the upper-layer agent and the upper-most managed-object instances in the inclusion relation stored in lower-layer MIBs managed by the lower-layer agent, but also correspondence information in a direct instance level between the upper and lower layers as to which managed-object instance has to be actually operated among data stored in the lower-layer MIBs, and information as to the parameters of one of the lower-layer MIBs to which the parameters of an operation request from the upper-layer agent are to be converted.

Since the managed-object correspondence information convert means has a common interface with respect to the lower-layer manager and the upper-layer agent, application programs for the upper and lower layers can be developed without concern with each other's specifications and conversion rules between the managed objects.

The correspondence between the managed objects and their operations and the detailed parameters thereof are converted altogether by the managed-object correspondence information convert means, and the converted data are stored in the managed-object correspondence information database.

Consequently, it is not necessary to carry out a conventional complex double data searching process and data converting process. The above correspondence can thus be searched for very quickly, and the burden on the application software program for the lower-layer manager can be reduced. As a result, the overall performance of the OSI multilayer management system can be increased.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 3:
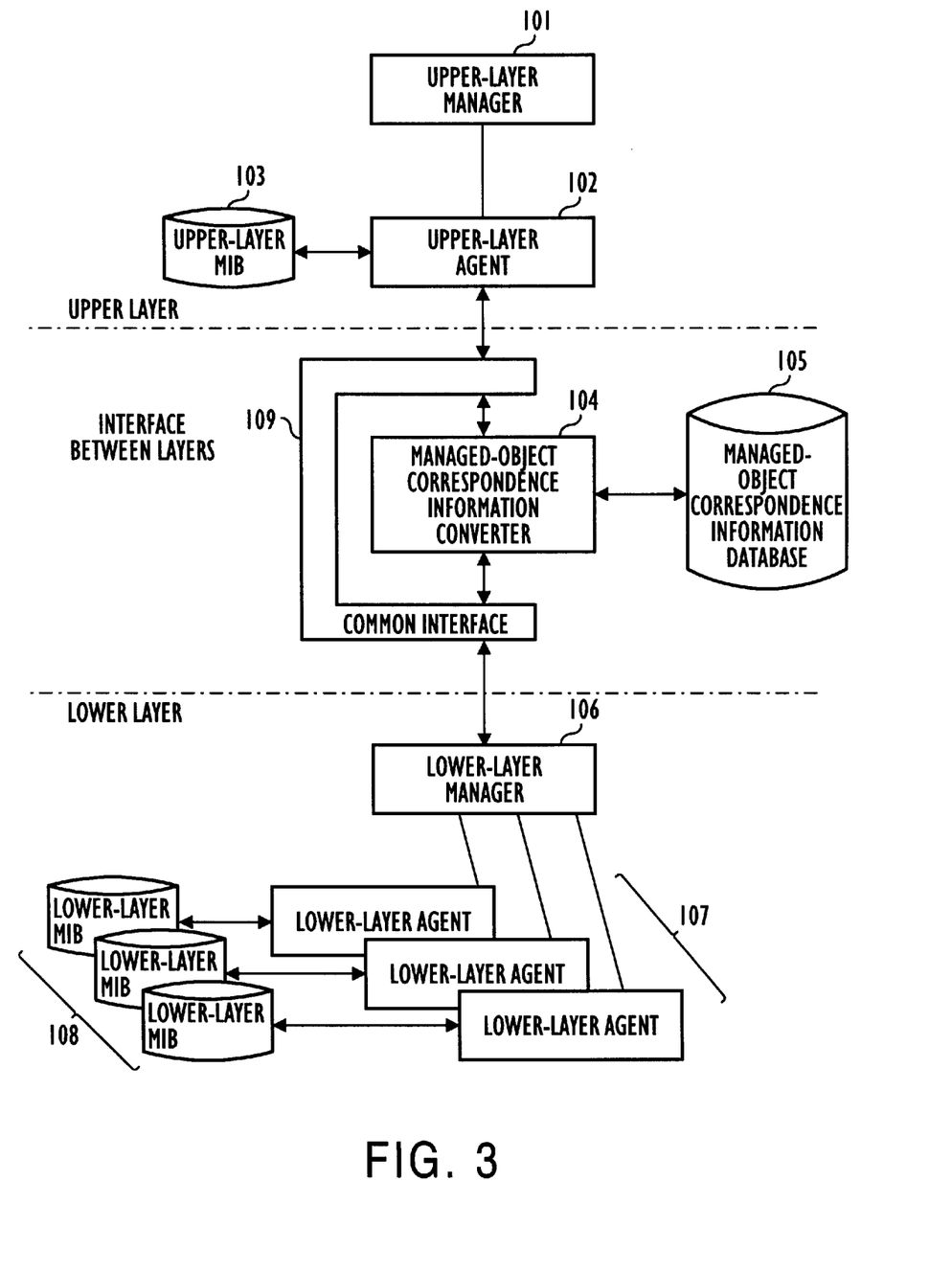
FIG. 3 is a block diagram of an OSI multilayer management system according to an embodiment of the present invention.

As shown in FIG. 3, an OSI multilayer management system according to an embodiment of the present invention comprises an upper-layer manager 101, an upper-layer agent 102 for actually performing a service function in response to a management service request from the upper-layer manager 101, an upper-layer MIB 103 which stores information of managed objects to be accessed when the upper-layer agent 102 performs a service function, a managed-object correspondence information converter 104 for mapping managed-object instances in two upper and lower layers onto corresponding operations when processing is to be carried out between the upper and lower layers, a common interface 109 for giving a common interface to the upper-layer agent 102 and a lower-layer manager 106 when the managed-object correspondence information converter 104 is accessed, a managed-object correspondence information database 105 which stores direct correspondences between managed-object instances of managed objects present between the upper and lower layers accessed by the managed-object correspondence information converter 104 and detailed parameters of their operations and notifications, a lower-layer manager 106 for performing a service function in response to a request from the upper-layer manager 101, a plurality of lower-layer agents 107 for performing a service function in response to a request from the lower-layer manager 106, and a plurality of lower-layer MIBs 108 which store information of managed objects to be accessed when the upper-layer agents 107 perform a service function.

Figure 4:
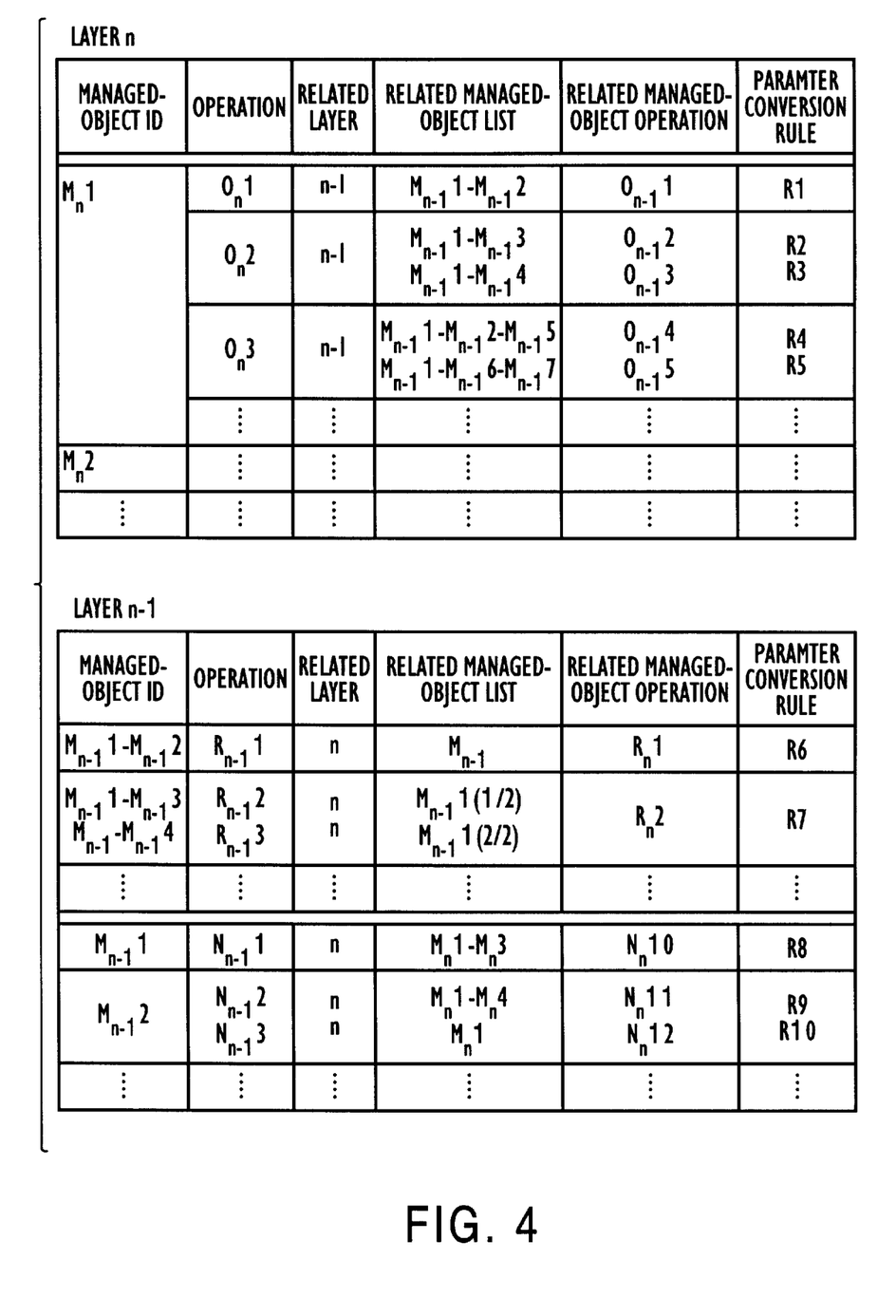
FIG. 4 is a diagram of the contents of items of information stored in a managed-object correspondence information database in the OSI multilayer management system shown in FIG. 3.

The managed-object correspondence information database 105 has two areas as shown in FIG. 4 which store the relationship between managed objects present in the different layers. One of the two areas of the managed-object correspondence information database 105 stores data to be referred to when a request comes from one of the layers, i.e., a layer "n" in FIG. 4, and the other of the two areas of the managed-object correspondence information database 105 stores data to be referred to when a request comes from the other of the layers, i.e., a layer "n−1" in FIG. 4.

The layers make up a range which is managed by the OSI multilayer management system. In the illustrated embodiment, the layer "n" serves as the upper layer whereas the layer "n−1" as the lower layer.

A managed-object ID is an identifier for uniquely identifying a managed object present in the layers. In the illustrated embodiment, identifiers for managed object instances present in the layer "n" are represented by $M_n1$~$M_n4$ whereas identifiers for managed-object instances present in the layer "n−1" are represented by $M_{n-1}1$~$M_{n-1}4$.

An operation represents an operation request given to a managed object indicated by a managed-object ID, a response thereto, or the item of an event notification. In the illustrated embodiment, operations $O_n1$~$O_n3$ represent the items of operation requests, operations $R_{n-1}1$~$R_{n-1}3$ represent the items of responses to operation requests, and operations $N_{n-1}1$~$N_{n-1}3$ represent the items of event notifications.

A related layer indicates a layer whose managed object is related to a managed object that is represented by a managed-object ID.

Figure 5:
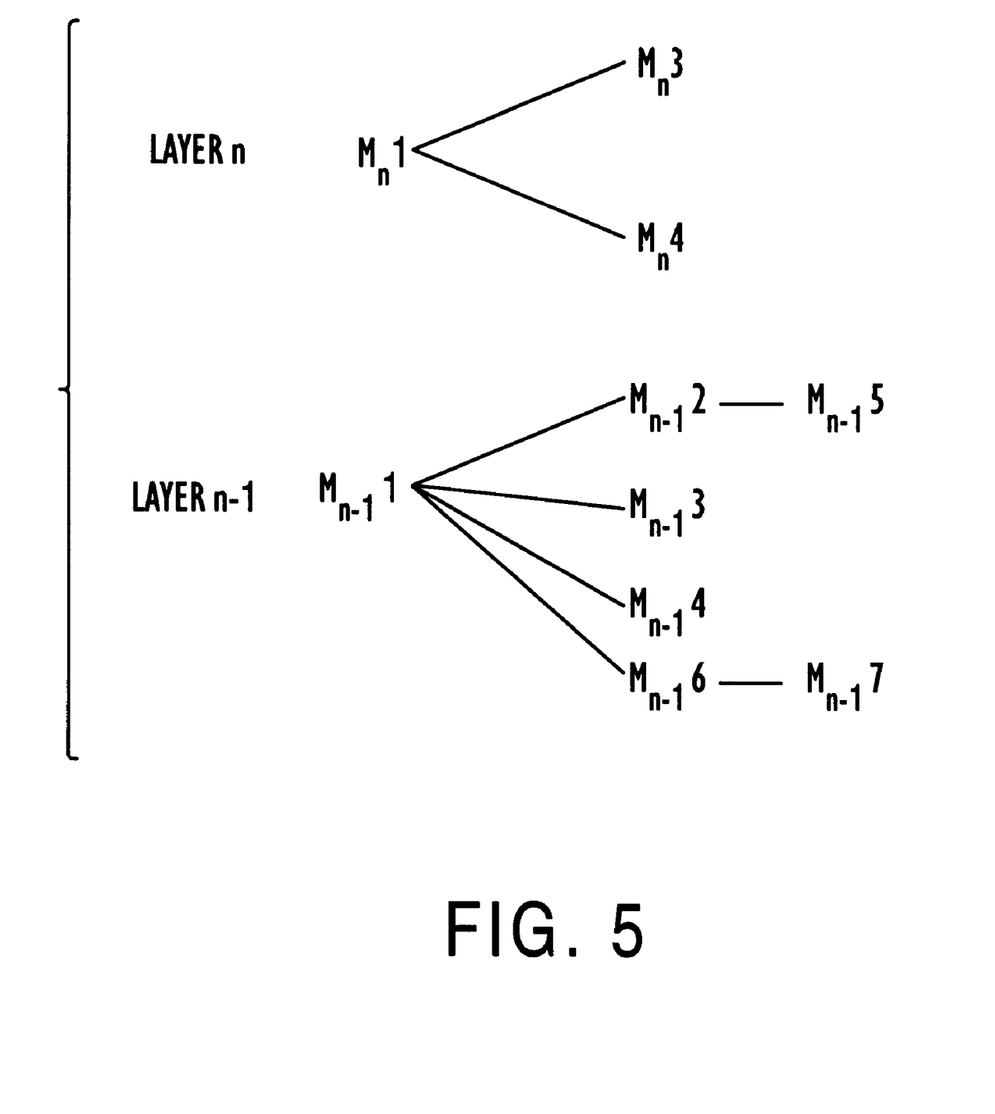
FIG. 5 is a diagram showing an inclusion relation between managed objects on a related managed-object list which is one of the items of information stored in the managed-object correspondence information database shown in FIG. 4.

A related managed-object list represents a list of identifiers of managed objects which are related in a related layer to a managed object that is represented by a managed-object ID. The related managed-object list stores a managed-object instance in a layer indicated by a related layer which actually starts or notifies an operation described in an operation item, in the form of a DN (Distinguished Name) structure from the upper-most instance in its inclusion relation. In $M_{n-1}1$–$M_{n-1}2$, for example, in the related managed-object list shown in FIG. 4, the identifier $M_{n-1}1$ represents the upper-most instance in the inclusion relation in the layer "n", and the identifier $M_{n-1}2$ represents an instance included in the identifier $M_{n-1}1$. FIG. 5 illustrates inclusion trees representing the inclusion relation shown in FIG. 4. In FIG. 5, the inclusion tree relative to the layer "n" indicates that the managed object $M_n1$ is the upper-most instance in the inclusion relation and includes subordinate instances $M_n3$, $M_n4$ in the inclusion relation, and the inclusion tree relative to the layer "n−1" indicates that the managed object $M_{n-1}1$ is the upper-most instance in the inclusion relation and includes subordinate instances $M_{n-1}2$, $M_{n-1}3$, $M_{n-1}4$, $M_{n-1}6$ in the inclusion relation. The instances $M_{n-1}2$, $M_{n-1}6$ include respective subordinate instances $M_{n-1}5$, $M_{n-1}7$.

A related managed-object operation represents an operation (as indicated by $O_{n-1}1$~$O_{n-1}5$) effected on an instance indicated in the related managed-object list, a response (as indicated by $R_n1$~$R_n2$) thereto, or an event notification ((as indicated by $N_{n-1}10$~$N_{n-1}12$)

Finally, a parameter conversion rule represents an identifier for identifying a conversion formula for converting the difference between detailed parameters due to a layer difference of requests/responses/notifications between an operation and a related managed-object operation. Identifiers for identifying conversion formulas comprise identifiers of parameter conversion rules given in Table 1 below which are associated with actual conversion formulas corresponding to the parameter conversion rules.

TABLE 1

| Conversion rule | Conversion formula |
| --- | --- |
| R1 | Conversion rule formula 1 |
| R2 | Conversion rule formula 2 |
| R3 | Conversion rule formula 3 |
| R4 | Conversion rule formula 4 |

Using a managed-object ID as a search key, the managed object correspondence information converter 104 finds a related managed object from the managed-object correspondence information database 105.

Operation of the OSI multilayer management system according to the illustrated embodiment will be described below with FIGS. 3 through 6 and Table 1.

In the illustrated embodiment, when the upper-layer manager 101 effects a certain operation $O_n1$, e.g., to change an attribute, on the managed object $M_n1$ stored in the upper-layer MIB 103, a managed object related to the managed object $M_n1$ and present in one of the lower layers 108 is processed accordingly, and a response indicative of the result of the processing is sent to the upper-layer agent 102. Such an operation sequence will be described below.

Figure 6:
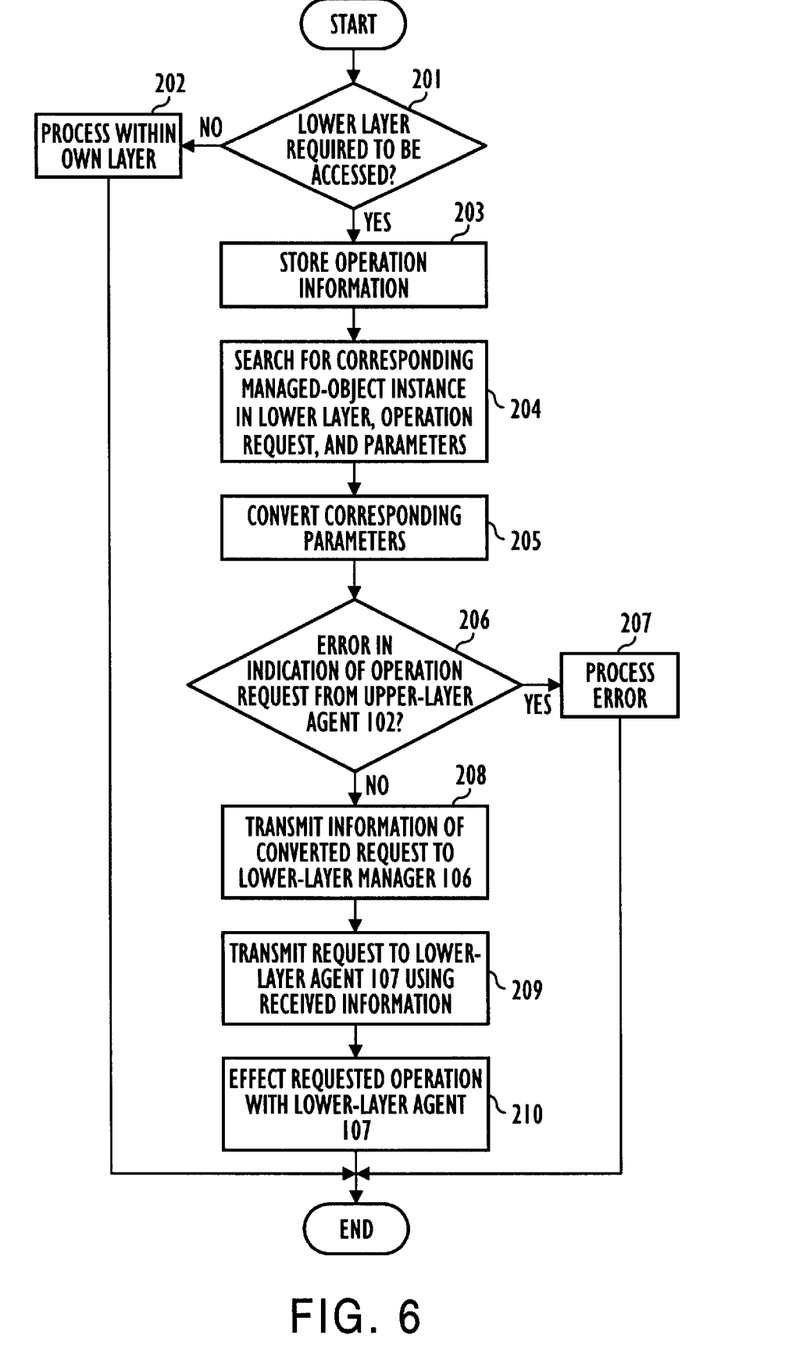
FIG. 6 is a flowchart of an operation request processing sequence of the OSI multilayer management system shown in FIG. 3.

First, an operation request processing sequence will be described below with reference to FIG. 6.

When requested to change an attribute (an operation $O_n1$) of the managed object $M_n1$ by the upper-layer manager 101, the upper-layer agent 102 accesses the managed object $M_n1$ stored in the upper-layer MIB 103, and operates to change the attribute. At this time, the upper-layer agent 102 checks if the change of the attribute of the managed object $M_n1$ affects managed objects in the lower layer or not, i.e., if an access to the lower layer is required or not, in a step 201. If no access to the lower layer is required and the change of the attribute can be processed within the upper layer, then the upper-layer agent 102 changes the attribute of the managed object $M_n1$ in a step 202, and the operation request processing sequence comes to an end.

If an access to the lower layer is required, then the upper-layer agent 102 stores the operation $O_n1$ requested by the upper-layer manager 101 and the managed object $M_n1$ as operation information in a step 203, and transmits the managed object $M_n1$, the operation $O_n1$, and detailed parameters accompanying the operation $O_n1$ to the managed-object correspondence information converter 104.

The managed-object correspondence information converter 104 then accesses the managed object correspondence information database 105 to acquire information of a related layer, a related managed-object instance, a related managed-object operation, and a parameter conversion rule which correspond to the managed object $M_n1$ and the operation $O_n1$ in a step 204. As shown in FIG. 4, the managed object $M_n1$ and the operation $O_n1$ correspond to a related layer "n−1", a related managed-object instance $M_{n-1}1$–$M_{n-1}2$, a related managed-object operation $O_{n-1}1$, and a parameter conversion rule R1 for conversion detailed parameters which accompany the operation request. The managed-object instance $M_{n-1}1$ is the upper-most instance in the inclusion relation in the lower-layer MIB 108 which stores the managed-object instance in the lower layer, and the managed-object instance $M_{n-1}2$ is a managed object instance included immediately below the upper-most instance in the above inclusion relation for actually carrying out the operation request. The managed-object correspondence information converter 104 generates an operation request for the lower-layer manager 106 from the above information, and converts parameters from the parameter type in the upper layer to the parameter type in the lower layer according to the parameter conversion rule R1 using Table 1 of the parameter conversion rules and the conversion formulas in a step 205. Then, the managed-object correspondence information converter 104 ascertains whether there is an error with respect to the indication of the operation request from the upper-layer agent 102 during the above information conversion process in a step 206. If there is an error, then the error is processed in a step 207, and then the operation request processing sequence comes to an end. If the information conversion process is finished and there is no error, then the managed-object correspondence information converter 104 transmits a request to the lower-layer manager 106 in a step 208. In the request, according to the illustrated embodiment, the managed-object instance whose attribute is changed is indicated by $M_{n-1}1-M_{n-1}2$, the operation to be effected on the object is indicated by $O_{n-1}1$, and the parameter conversion rule for detailed parameters for use in the operation in the lower layer with respect to the request parameters from the upper layer is indicated by R1.

Then, using the transmitted information, the lower-layer manager 106 transmits a corresponding request to the lower-layer agent 107 in a step 209. The lower-layer agent 107 accesses the lower-layer MIB 108 and executes the requested operation in a step 210. Thereafter, the operation request processing sequence is finished. Specifically in the illustrated embodiment, the lower-layer manager 106 recognizes, from the received information $M_{n-1}1-M_{n-1}2$ of the managed-object instance, that the lower-layer agent 107 to be accessed is managing the lower-layer MIB 108 which has the managed object $M_{n-1}1$ as the upper-most instance in the inclusion relation, and starts to effect the operation $O_{n-1}1$ on the managed-object instance $M_{n-1}2$ in the lower-layer agent 107.

Figure 7:
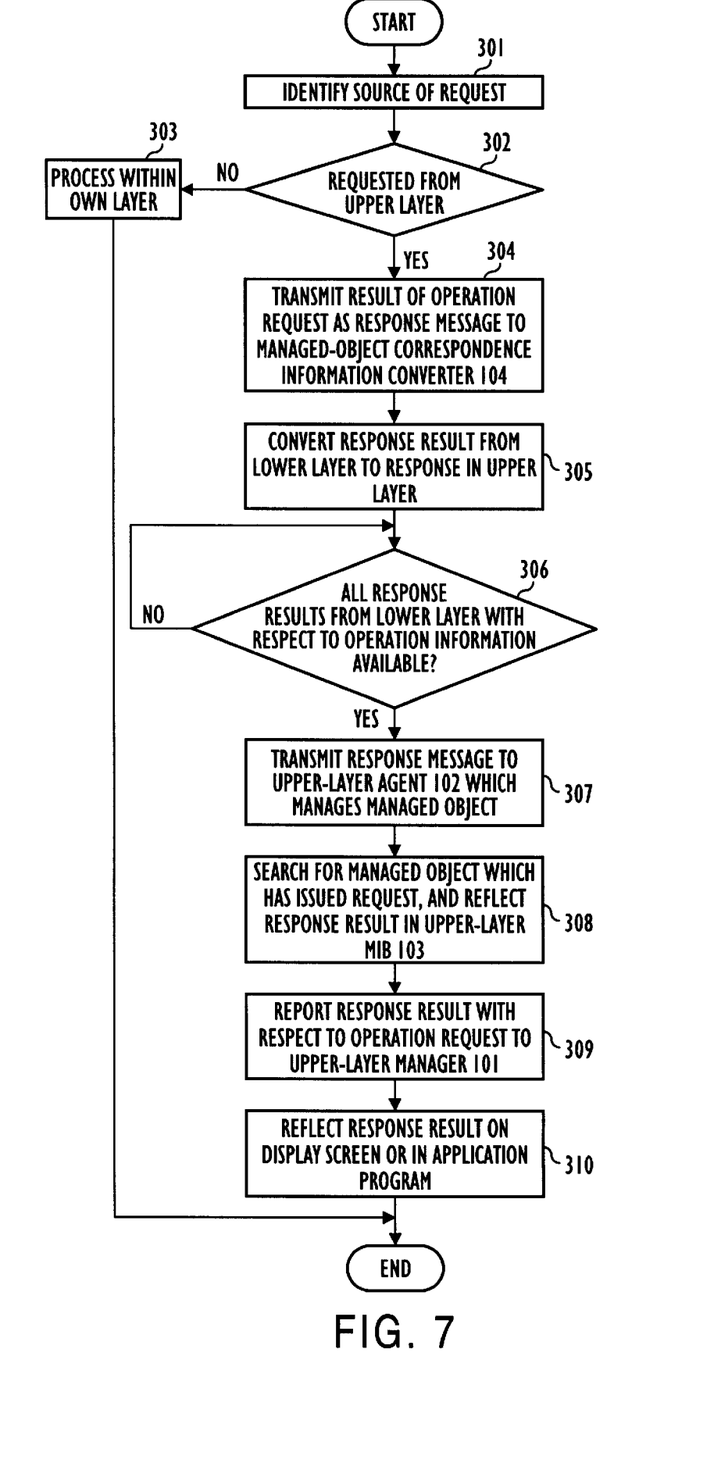
FIG. 7 is a flowchart of an operation response processing sequence of the OSI multilayer management system shown in FIG. 3.

An operation response processing sequence of the OSI multilayer management system, which processes a response to the operation request in the operation request processing sequence shown in FIG. 6, will be described below with reference to FIG. 7.

When the requested operation $O_{n-1}1$ in the lower-layer agent 107 is finished and a response is sent to the lower-layer manager 106, the lower-layer manager 106 identifies the source of the request in a step 301 and determines whether the processing carried out in the lower-layer agent 107 has been requested from the upper layer or directly from the operator in a step 302. If the processing has been requested directly from the operator, then the lower-layer manager 106 displays the result of the operation on a display screen or processes the result of the operation according to an application software program in a step 303, after which the operation response processing sequence is ended. If the processing has been requested from the upper layer, then the lower-layer manager 106 transmits a result $R_{n-1}1$ with respect to the requested operation $O_{n-1}1$ as a response message to the managed-object correspondence information converter 104 in a step 304.

In response to the response message, the managed-object correspondence information converter 104 accesses the managed-object correspondence information database 105, and converts detailed parameters from the managed-object instance $M_{n-1}1-M_{n-1}2$ in the lower-layer MIB 108 which has transmitted the response information and its operation (response result $R_{n-1}1$) to those of the corresponding managed-object instance in the upper layer and its operation (a response to the operation) in a step 305.

It can be seen from FIG. 4 that the response message $R_{n-1}1$ from the managed object $M_{n-1}1-M_{n-1}2$ in the layer "n−1" (lower layer) corresponds to $M_n1$ in the layer "n" (upper layer), the operation (response result) in the upper layer is indicated by $R_n1$, and the detailed parameter conversion rule is indicated by R6. Even if the response result produced in this processing suffers an error (e.g., even if the operation request cannot be carried out), the result is converted into a response $R_n1$ as an error of the corresponding managed-object instance in the upper layer according to the parameter conversion rule R6. Therefore, no special error processing is required.

At this time, the managed-object correspondence information converter 104 recognizes, from the items of the related managed-object list, whether the corresponding managed object in the upper layer, of the information located from the managed-object correspondence information database 105, uses a response from one lower layer as a response of the managed object in one upper layer or uses responses from a plurality of lower layers as a response of the managed object in one upper layer (see Note 1 in Table 1). If the managed object in the upper layer issues responses from managed objects in a plurality of lower layers as a response of the managed object in one upper layer, then the managed-object correspondence information converter 104 waits until an expected response is transmitted unless it has received all responses up to the expected response ("NO" in a step 306). In the illustrated embodiment, since a response is to be given to only the managed object $M_n1$ in the upper layer as shown in FIG. 4, the answer to the step 306 is "YES", and the managed-object correspondence information converter 104 transmits the converted information to the upper-layer agent 102 in a step 307.

In response to the response message, the upper-layer agent 102 searches for operation information stored in the step 203, recognizes that the response represents a result of the operation, and reflects the contents of the response in the corresponding managed-object instance in the upper-layer MIB 103 in a step 308.

When the processing in the upper-layer MIB 103 is finished, the upper-layer agent 102 returns a response message with respect to the operation request to the upper-layer manager 101 in a step 309.

In response to the response message, the upper-layer manager 101 reflects the response to the operation on the display screen or in the application software program in a step 310, after which the operation response processing sequence is brought to an end.

Figure 8:
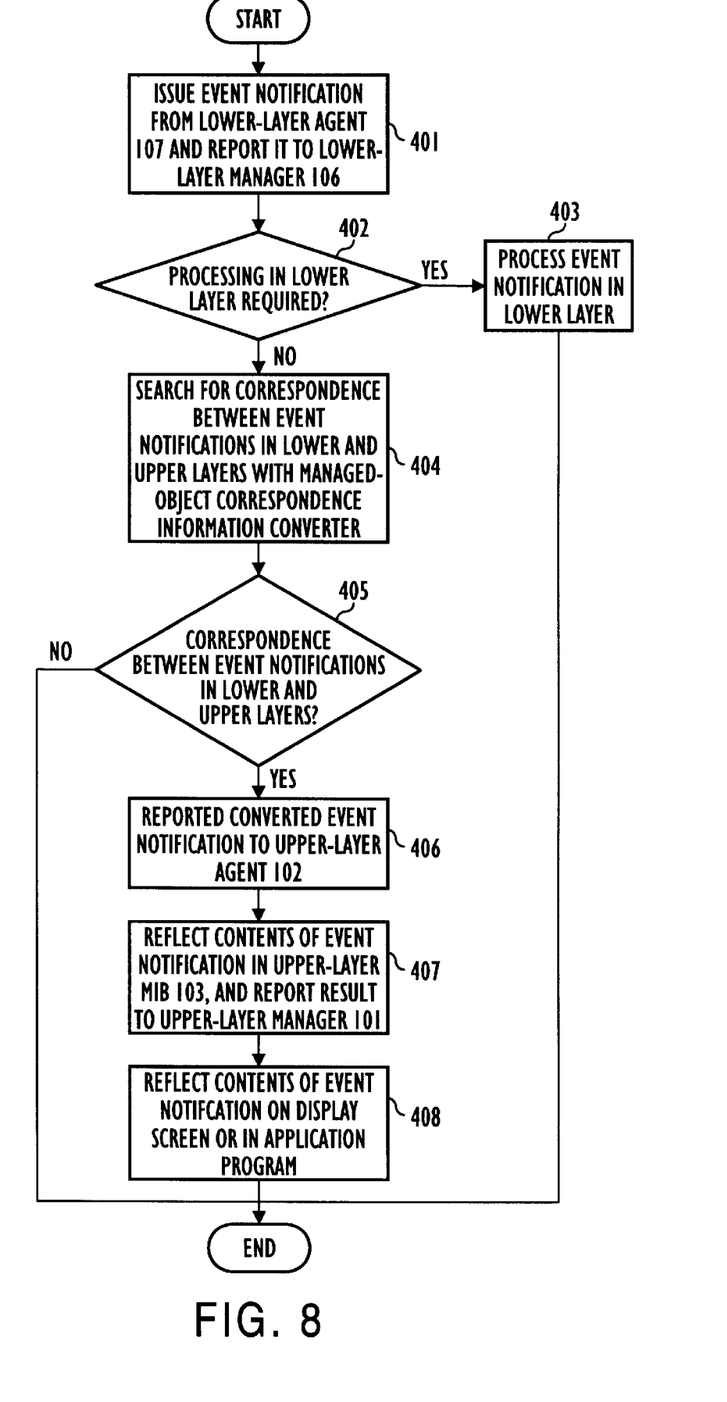
FIG. 8 is a flowchart of an event notification processing sequence of the OSI multilayer management system shown in FIG. 3.

An event notification processing sequence of the OSI multilayer management system, for reflecting the result of an event notification $N_{n-1}1$ produced in the managed object $M_{n-1}1$ stored in the lower-layer MIB 103 in a managed object Mn3 stored in the upper-layer MIB 103 and related to the managed object $M_{n-1}1$, will be described below with reference to FIG. 8.

The lower-layer agent 107 gives an event notification $N_{n-1}1$ produced in the managed object $M_{n-1}1$ to the lower-layer manager 106 in a step 401.

The lower-layer manager 106 determines whether the received event notification is required to be processed within its own layer or not in a step 402. If required, then the lower-layer manager 106 processes the event notification by itself, and reflects the result on the display screen or in the application software program in a step 403. If not required, then the lower-layer manager 106 transmits all received event notifications to the managed object correspondence information converter 104. The managed-object correspondence information converter 104 searches for the managed-object instance in the lower layer and the corresponding managed-object instance in the upper layer, and also converts the event notification from the lower layer to a corresponding operation in the upper layer in a step 404. It can be seen from FIG. 4 that the managed-object instance $M_{n-1}1$ which has reported the event notification $N_{n-1}1$ in the lower layer corresponds to the managed-object instance $M_n1-M_n3$ in the upper layer, the corresponding operation in the upper layer is represented by $N_n10$, and the parameters are to be converted according to the parameter conversion rule R8.

Since the lower-layer manager 106 transmits all event notifications to the managed-object correspondence information converter 104 without being concerned with event notifications which are not related to event notifications in the upper layer, event notifications which do not correspond to the upper layer occur in the managed-object correspondence information database 105. The managed object correspondence information converter 104 decides that those event notifications which do not correspond to the upper layer in the managed-object correspondence information database 105 are not required to be reflected in the upper layer in a step 405, and then finishes the event notification processing sequence. Event notifications which correspond to the upper layer in the managed-object correspondence information database 105 are reported to the upper-layer agent 102 in a step 406. The upper-layer agent 102 reflects the contents of the event notifications in the upper-layer MIB 103 in a step 407.

When the processing in the upper-layer MIB 103 by the upper-layer agent 102 is finished, the upper-layer agent 102 reports the result to the upper-layer manager 101, which reflects the contents of the-event notifications on the display screen or in the application software program sin a step 408. Then, the event notification processing sequence comes to an end.

While a preferred embodiment of the present invention has been described using specific terms, such description is for illustrative purposes only, and it is to be understood that changes and variations may be made without departing from the spirit or scope of the following claims.

What is claimed is:

1. An OSI multilayer management system comprising:
a hierarchical manager-agent structure of upper and lower layers in an open system having OSI standard protocol specifications, the upper layer having an upper-layer manager, an upper-layer agent, and managed objects, and the lower layer having a lower-layer manager, a lower-layer agent, and managed objects;
a managed-object correspondence information database storing related information of the managed objects of the upper and lower layers; and
managed-object correspondence information convert means connected to said managed-object correspondence information database, for receiving operations, responses, and event notifications from the managed objects of the upper and lower layers, converting operations, responses, and event notifications from the managed objects of one of the upper and lower layers to operations, responses, and event notifications for the managed objects of the other of the upper and lower layers, and requesting the upper-layer agent or the lower-layer manager to effect operations, responses, and event notifications;
said upper-layer agent having a communication path connected to said managed-object correspondence information convert means and comprising means for issuing an operation request through said communication path to operate the managed-objects in the lower layer, receiving a response to the operation request and an event notification from the managed objects in the lower layer, and effecting an operation on the managed objects in the upper layer based on the received event notification;
said lower-layer manager having a communication path connected to said managed-object correspondence information convert means and comprising means for issuing an event notification through said communication path to the managed objects in the upper layer.

2. An OSI multilayer management system comprising:
a hierarchical manager-agent structure of upper and lower layers in an open system having OSI standard protocol specifications, the upper layer having an upper-layer manager, an upper-layer agent, and managed objects, and the lower layer having a lower-layer manager, a lower-layer agent, and managed objects;
a managed-object correspondence information database storing related information of the managed objects of the upper and lower layers; and
managed-object correspondence information convert means connected to said managed-object correspondence information database, for receiving operations, responses, and event notifications from the managed objects of the upper and lower layers, converting operations. responses, and event notifications from the managed objects of one of the upper and lower layers to operations, responses, and event notifications for the managed objects of the other of the upper and lower layers, and requesting the upper-layer agent or the lower-layers, and requesting the upper-layer agent or the lower-layers, and requesting the upper-layer agent or the lower-layer manager to effect operations, responses, and event notifications;
wherein;
said upper-layer agent has a communication path connected to said managed-object correspondence information convert means and comprises means for: (1) issuing an operation request through said communication path to operate the managed-objects in the lower layer, (2) receiving a response to the operation request and an event notification from the managed objects in the lower layer, and (3) effecting an operation on the managed objects in the upper layer based on the received event notification;
said lower-layer manager has a communication path connected to said managed-object correspondence information convert means and comprises means for issuing an event notification through said communication path to the managed objects in the upper layer; and
said managed object correspondence information database stores two types of data depending on which one of the upper and lower layers has issued a management operation request, each of said two types of data including managed-object ID items indicative of identifiers of the managed objects, operation items with respect to the managed objects identified by said managed-object ID items, related layer items indicative of the layers in which managed objects related to the managed objects identified by said managed-object ID items are stored, related managed-object list items storing a list items storing a list indicative of correspondence between the managed objects identified by said managed object ID items and instances which are actual managed objects of those managed objects in the layers indicated by the related layer items, related managed-object operation items indicative of operations with respect to managed objects indicated by said related managed-object list items, parameter conversion rule items indicative of parameter conversion rules for converting detailed parameters accompanying operations/responses between said related managed-object operation items and said operation items, and a table of association between the parameter conversion rules and actual conversion formulas with respect to said parameter conversion rule items.

3. An OSI multilayer management system according to claim 1, wherein said managed-object correspondence information convert means has a common interface with respect to said lower-layer manager and said upper-layer agent.

4. A method for effecting operations between an upper layer and a lower layer in an OSI multilayer management system, said method comprising:

provi ding a managed object correspondence information database including predetermined relations between first layer operations of first layer managed objects and second layer operations of second layer managed objects;

making a determination for one of said first layer operations of one of said first layer managed objects, as to whether a second layer access is required to effect said one of said first layer operations;

when said determination indicates that said second layer access is required, identifying from said predetermined relations in said database one of said second layer managed objects and one of said second layer operations related to said one of said first layer managed objects and said one of said first layer operations; and performing said corresponding second layer operation with respect to said corresponding second level managed object.

5. The method for effecting operations as set forth in claim 4, wherein:

said first layer is an upper layer and said second layer is a lower layer;

said step of making said determination is performed by an upper layer agent;

said one of said first layer operations for said one of said first layer managed objects is determined by an upper layer manager;

said step of identifying is performed with a managed object correspondence information converter; and said step of performing said corresponding second layer operation is enacted by a lower layer manager in conjunction with a lower layer agent.

6. The method for effecting operations as set forth in claim 4, wherein:

said first layer is a lower layer and said second layer is an upper layer;

said step of making said determination is performed by a lower layer agent;

said one of said first layer operations for said one of said first layer managed objects is determined by a lower layer manager;

said first layer operations include a response to a second layer operation and an event notification;

said step of identifying is performed with a managed object correspondence information converter; and said step of performing said corresponding second layer operation is enacted by an upper layer manager in conjunction with an upper layer agent.

7. The method for effecting operations as set fortin in claim 4, wherein:

said step of providing a managed object correspondence information database is performed so that said managed object correspondence information database stores two types of data for use depending on which one of the first and second layers issues a management operation request, each of said two types of data including managed-object ID items indicative of identifiers of the managed objects, operation items with respect to the managed objects identified by said managed-object ID items, related layer items indicative of the layers in which managed objects related to the managed objects identified by said managed-object ID items are stored, related managed-object list items storing a list items storing a list indicative of correspondence between the managed objects identified by said managed object ID items and instances which are actual managed objects of those managed objects in the layers indicated by the related layer items, related managed-object operation items indicative of operations with respect to managed objects indicated by said related managed-object list items, parameter conversion rule items indicative of parameter conversion rules for converting detailed parameters accompanying operations/responses between said related managed-object operation items and said operation items, and a table of association between the parameter conversion rules and actual conversion formulas with respect to said parameter conversion rule items.

* * * * *